J. J. McGUIRE.
CONVERTIBLE AUTOMOBILE BODY.
APPLICATION FILED MAY 26, 1921.

1,433,466.

Patented Oct. 24, 1922.

WITNESSES
William P. Goebel
J. H. Mood

INVENTOR
J. J. McGUIRE
BY
Munn & Co.
ATTORNEYS

J. J. McGUIRE.
CONVERTIBLE AUTOMOBILE BODY.
APPLICATION FILED MAY 26, 1921.

1,433,466.

Patented Oct. 24, 1922.

WITNESSES
William P. Goebel.

INVENTOR
J. J. McGuire

BY
ATTORNEYS

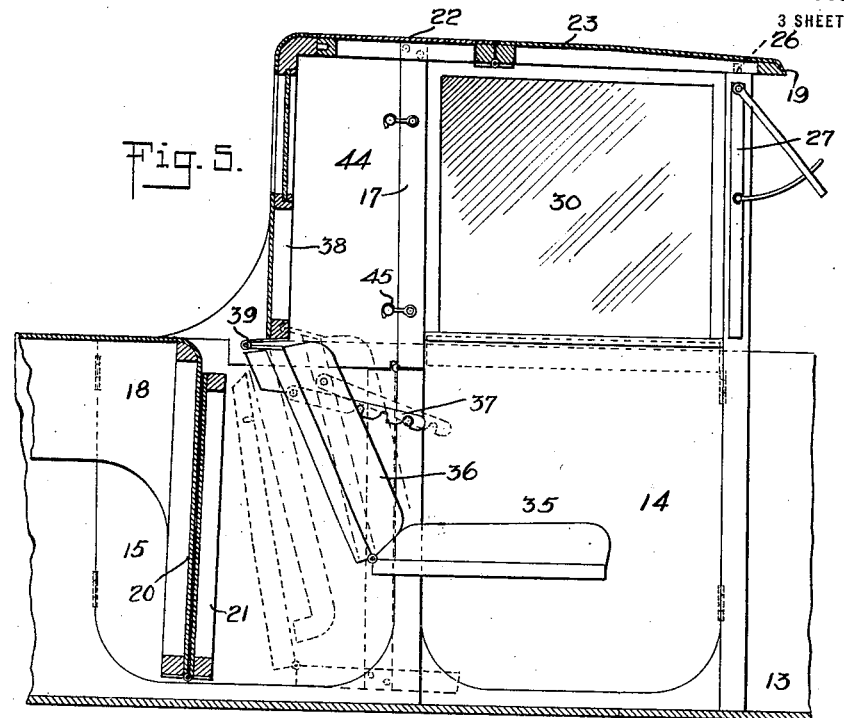
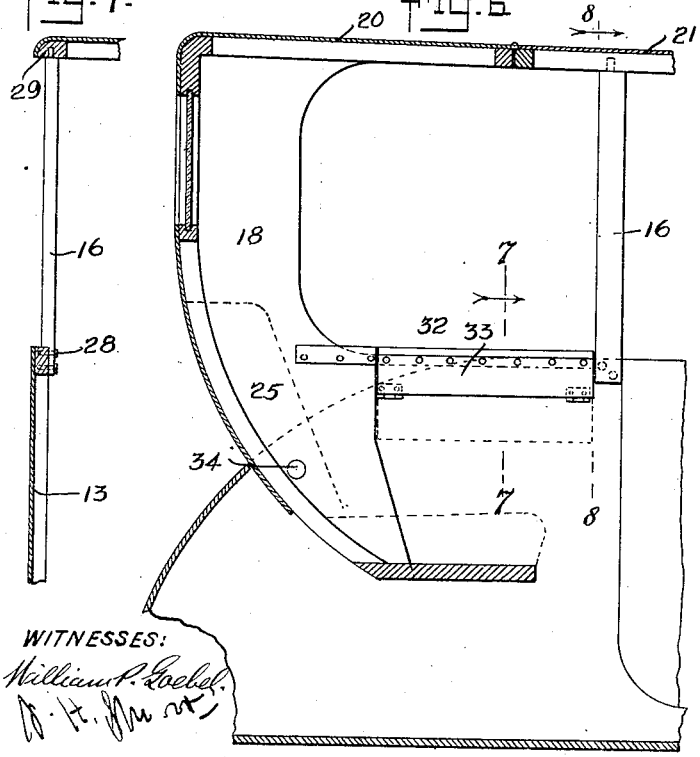
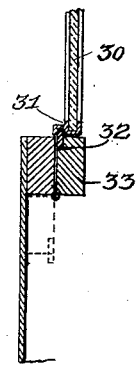

Patented Oct. 24, 1922.

1,433,466

UNITED STATES PATENT OFFICE.

JOHN JOSEPH McGUIRE, OF YONKERS, NEW YORK.

CONVERTIBLE AUTOMOBILE BODY.

Application filed May 26, 1921. Serial No. 472,674.

*To all whom it may concern:*

Be it known that I, JOHN J. McGUIRE, a citizen of the United States, and resident of Yonkers, in the county of Westchester and State of New York, have invented a new and Improved Convertible Automobile Body, of which the following is a full, clear, and exact description.

My invention relates to a convertible body for vehicles, and more particularly to provide improvements over my prior construction, as illustrated in Patent #1344546, issued June 22, 1920.

More particularly my invention provides a convertible body, more particularly adapted for use in connection with motor vehicles, and by means of which a number of standard bodies may be formed within a short interval of time, so that the user may have available, in a single motor vehicle, a limousine or sedan type of body, a coupé, roadster, or touring body.

My present invention also has as its object, the provision of a device of the character specified in which the parts may more readily be assembled or disengaged from each other, and in which the body presented will incorporate a "steam-line" appearance conforming to the modern types of bodies.

Still another object of this invention is the provision of a convertible body which will cost very little more than the average enclosed body, and by means of which an owner will be enabled to instantly manipulate the parts to form any desired type of standard body.

Further objects of my invention will appear in the annexed specification taken in connection with the drawings which latter present one practical embodiment of the same, and in which;

Figure 5 is an enlarged cross sectional view of the device as illustrated in Figure 2.

Figure 6 is a fragmentary sectional side view of the rear portion of the vehicle tonneau as the same appears in Figure 4.

Figure 1:
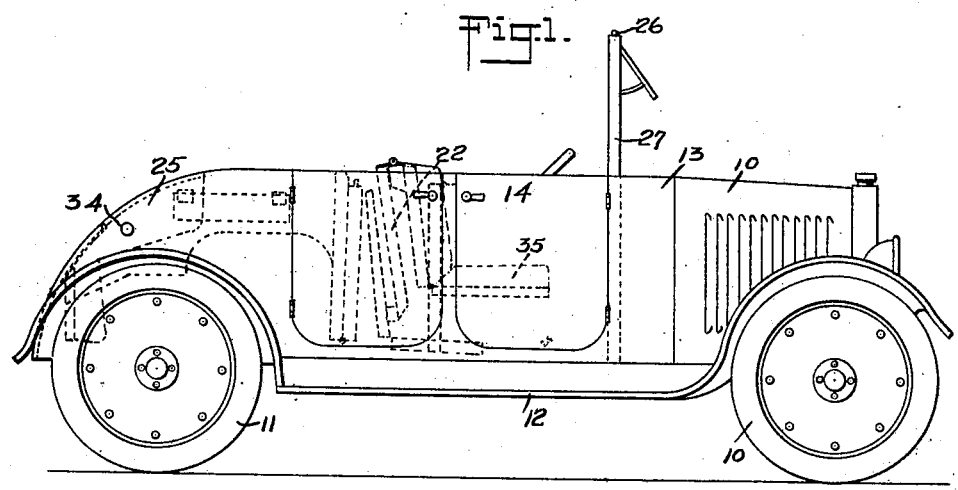
Figure 1 illustrates the appearance of the body when the same forms a roadster.

Figures 7 and 8 are sectional views taken along the lines 7—7, and 8—8 and in the direction of the arrows indicated in Figure 6.

Referring now more particularly to Figures 1 to 4, it will be seen that the reference numeral 10 indicates the hood of a motor vehicle, which includes in the usual manner wheels 11, and running boards and mud guards 12, extending between the wheels and longitudinal of the body.

Referring primarily to the limousine or sedan construction illustrated in Figures 4 and 7 to 9, it will be seen that the body 13 presents in the usual manner a pair of doors 14 and 15, also side braces 16 and 17, are provided which are removably connected to the body 13, and which serve to support a top comprising two sections 18 and 19, each in turn including pairs of sections 20, 21; 22 and 23; these subsections being hingedly attached to each other as has been indicated by the reference numeral 24.

The top thus formed, extends throughout the entire length of the tonneau, and has its rear end terminating in the form of a conventional enclosed body providing seats 25, its forward end resting upon and being engaged by pintles 26 affixed to the upper end of the wind shield frame 27.

The method of detachably securing the side braces 16 and 17 to the body and to the top has been illustrated in Figure 7, it being noted that pins 28 are preferably utilized adjacent the points of contact of the side braces with the upper edge of the body, while the pintle 29 co-operates with a recess forming a part of the side edge of the top, although obviously any suitable form of detachable connection may be utilized in this connection.

The windows 30 are retained in their proper position by preferably utilizing a double channel strip 31, one channel of which co-operates with the edge of the window 30, the second channel thereof overlying a strip 32 which is secured to a supplemental strip 33 hingedly attached to the body, so as to be capable of being folded flush against the same.

Figure 2:
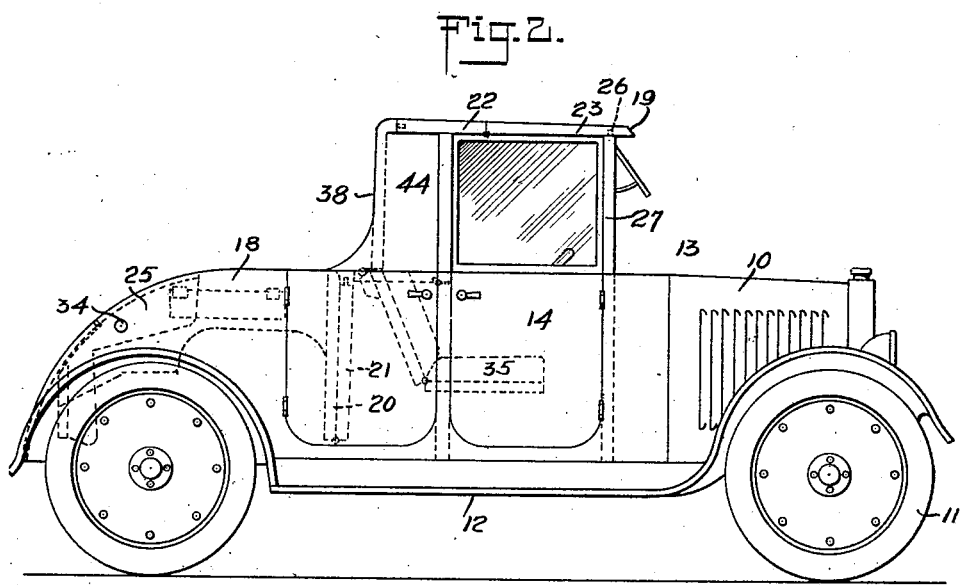
Figure 2 shows the body having its parts disposed to provide a coupé.
Figure 3:
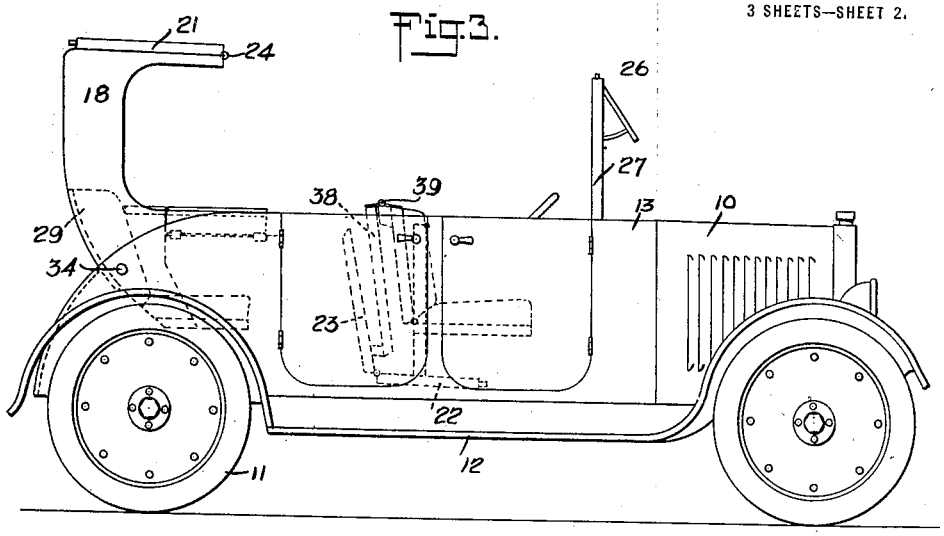
Figure 3 shows the parts of the body disposed so as to provide a touring car with a Victoria top.
Figure 4:
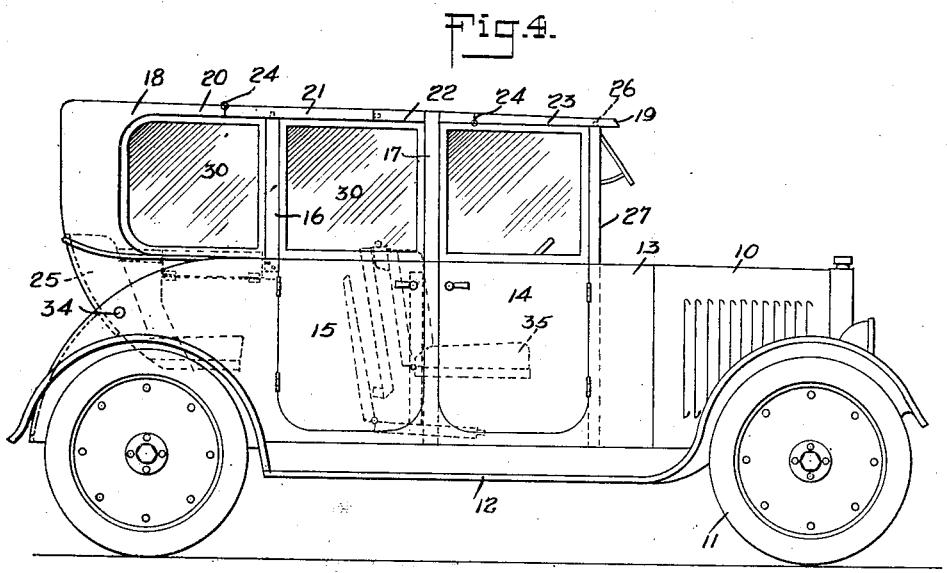
Figure 4 is a similar view but showing the parts arranged to present a limousine or sedan appearance.

If the body thus formed is to be converted into a coupé as in Figures 2, 5 and 6, this may be accomplished by swinging the entire rear section of the top 18, and body around the pivot pin 34, which supports the same after having first of all removed the side brace 16, window panels 30, and having folded the sub-section 21 of the top rearwardly flush upon the sub-section 20 thereof. The entire rear of the body will now lie in the position shown in Figure 5, and in this position the rear of the body will constitute the upper face of the rear back of the coupé as in Figure 2. The seat 35 within the forward portion of the tonneau may have its back 36 swung to the position indicated in dotted lines in Figure 5 by means of the supporting member 37 provided for this purpose, and the rear section 38 previously disposed within the tonneau by swinging the same around its supporting hinge 39, may be swung from the position indicated in dotted lines in Figure 5 to that shown in full lines. In this latter position it will contact and cooperate with the sub-sections 22 and 23 of the forward portion of the roof, which remains stationary, and a coupé of extremely pleasing appearance will now be presented as in Figure 2.

It is to be noted in this construction that I preferably brace the side strips 17 and completely close the vehicle by utilizing side inserts 44 which latter may be retained in applied position by any suitable means such as hooks 45 provided for this purpose.

If a touring body is now desired, the side inserts 44 may be removed and stowed in any desirable place. The rear section 38 is folded downwardly and rearwardly, and the forward sub-sections 22 and 23 of the top are also folded upon themselves and disposed in the space provided for this purpose to the rear of the seat back 36.

Finally if a roadster body is to be formed, this may be accomplished by permitting all of the portions of the coupé to remain in their now stowed positions, and in arranging the parts of the rear body in the position which they assume when a coupé body is formed. Thus the appearance presented in Figure 1 will be achieved, and an extremely neat appearing speedster body will be provided.

Thus it will be appreciated that I have provided a convertible body by means of which all of the objects set forth in the statement of invention of this specification will have been accomplished and in which an owner by purchasing a single body will be enabled to have at his disposal various types of cars.

Obviously numerous modifications of structure might readily be resorted to without in the least departing from the spirit of my invention, which I claim as:

1. A convertible body for vehicles comprising a rear section pivotally supported by a vehicle and a roof portion comprising a pair of sub-sections forming part of said rear section, said sub-sections being hingedly secured to each other, a forward roof section also comprising a pair of sub-sections hingedly attached to each other, the innermost of said sections engaging the outermost section of said rear roof portion, said braces detachably interposed between said vehicle and roof portion, double channel members secured adjacent the upper edges of said vehicle body and strips hingedly attached adjacent the inner upper side edges of the rear body portion for engaging one of the channels and providing a rest therefor.

2. A convertible body for vehicles including in combination with a lower body, of a rear body pivotally attached thereto, said rear body portion being capable of being swung to constitute a deck, a forward body portion secured to said lower body, a roof, inserts interposed between said lower body and the roof, and fastening means for detachably securing said inserts in position.

JOHN JOSEPH McGUIRE.